United States Patent

[11] 3,558,948

| [72] | Inventor | Nikolaus Laing<br>35-37 Hofener Weg 7141, Aldingen, Germany |
|---|---|---|
| [21] | Appl. No. | 799,890 |
| [22] | Filed | Feb. 17, 1969 |
| [45] | Patented | Jan. 26, 1971<br>Continuation-in-part of application Ser. No. 685,931, Nov. 27, 1967, now Patent No. 3,438,328. |

[54] MAGNETIC ROTARY MACHINE
6 Claims, 6 Drawing Figs.

| [52] | U.S. Cl. | 310/157 |
|---|---|---|
| [51] | Int. Cl. | H02k 7/08 |
| [50] | Field of Search | 310/66, 82, 84, 90, 114, 115, 116, 118, 152, 156, 157, 266, 104; 103/87M; 230/No search; 192/No search |

[56] References Cited
UNITED STATES PATENTS

| 1,363,087 | 12/1920 | Clayton | 310/157 |
|---|---|---|---|
| 1,454,041 | 5/1923 | Cramer | 310/157 |
| 2,207,251 | 7/1940 | Guedon | 310/157 |
| 2,548,799 | 4/1951 | Johnson | 310/66 |
| 3,354,833 | 11/1967 | Laing | 103/87 |

*Primary Examiner*—Milton O. Hirshfield
*Assistant Examiner*—R. Skudy
*Attorney*—Pennie, Edmonds, Morton, Taylor and Adams

ABSTRACT: A magnetic rotary machine or coupling having two axially opposed rotary magnetic elements with an air gap therebetween wherein one of the elements has a concave surface adjacent the air gap and the other element has a convex surface adjacent the air gap and where both elements have limited universal movement about a common center of the convex and concave surfaces.

3,558,948

MAGNETIC ROTARY MACHINE

This application is a continuation-in-part application of my copending application Ser. No. 685,931 filed Nov. 27, 1967 now U.S. Pat. No. 3,438,328, dated April 15, 1969.

THE PRIOR ART

A torque transmitting device incorporating a magnetic coupling in which the rotor, together with the stator producing the rotary field, forms an air gap being traversed by the magnetic field and being limited by spherical or cylindrical surfaces of both elements of the coupling is known from the U.S. Pat. 3,354,833.

In the devices as shown in that patent a rotor is mounted in a bearing in which it is permitted to exert a universal movement about the center of the surfaces of said rotor and the stator limiting the air gap. By means of this magnetic rotary machine which is known it is possible to construct couplings, magnetic motors, magnetic transmissions etc. in which the driven rotary element centers itself automatically with reference to the driving element, and it is possible to separate the two elements of the rotary machine by a separation wall arranged within the air gap of the rotary machine. The magnetic rotary machine which is known has proved to be particularly advantageous as a pump drive.

This known arrangement is especially advantageous if the diameter of the rotor mounted for a universal movement about a fixed point corresponds approximately to the diameter of the pump rotor and may thus form one of the limitations of said pump rotor.

Now it has been discovered that the mounting of the rotor permitting a universal movement about a fixed point has advantages also for other machines, such as blowers or grinding machines or even slowly running pumps whose rotor diameter is comparatively large in relation to their performance. However for these applications the torque transmission device which is known is not satisfactory as the element driven by the rotor is able to contact the driving element during the universal movement, thus restricting the advantages of the mounting for universal movement about a fixed point.

DESCRIPTION OF THE INVENTION

Therefore, an object of the invention is to provide for a magnetic rotary machine wherein the parts may have limited universal movement where the machine is suitable for application to fluid flow machines incorporating rotors of comparatively large diameters. Broadly the invention comprises including in a magnetic rotary machine a first rotary magnetic element for generating an electrical field about the axis of rotation of the rotary machine and a second rotary magnetic element which is displaced axially with respect to the first element along the axis of rotation of the machine and where an air gap is formed between the two elements. The surface of one of the elements adjacent the air gap is of a convex shape and the surface adjacent the air gap of the second element is of a concave shape. Both elements are mounted for limited universal movement about a center which is common to both the convex and concave surfaces of the two elements.

The invention is explained in further detail by the examples of the FIGS.

Figure 1:
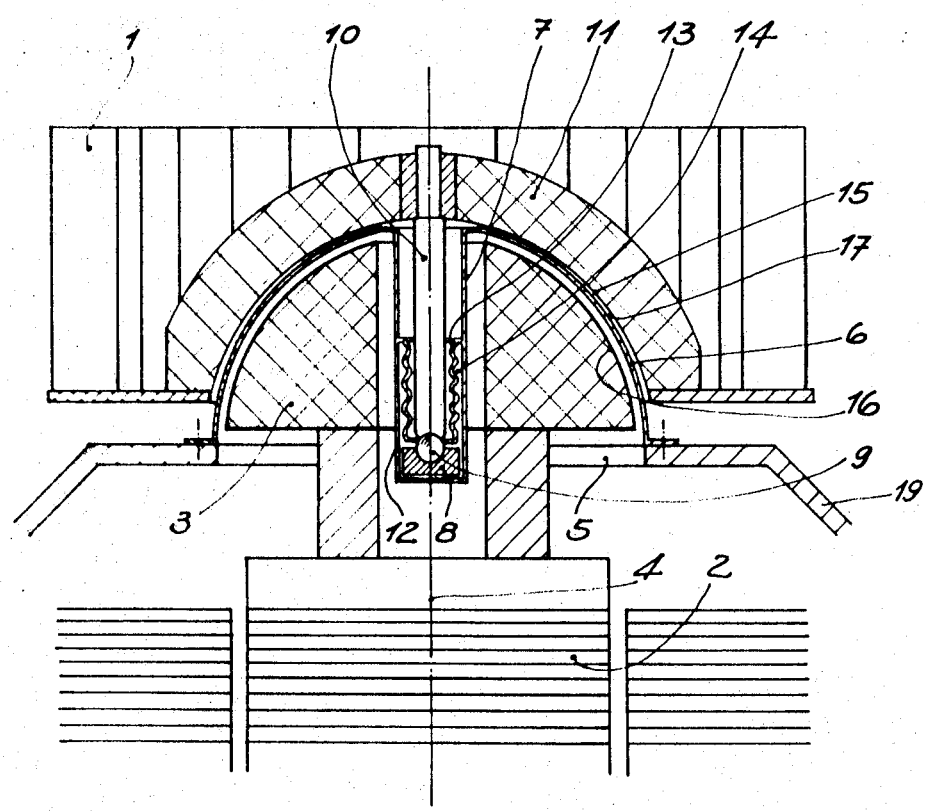
FIG. 1 shows a cross section of a magnetic coupling device according to this invention for driving a fan being hermetically sealed from the motor compartment.

FIG. 1 shows a magnetic coupling which is used to drive a fan rotor 1. The fan rotor is driven by a motor whose armature bears the reference number 2. The armature is connected to a rotor 3 of hemispherical shape being made from a permanent magnetic material. Both the armature 2 and the rotor 3 are rotatable about the axis 4. The rotor 3 is magnetized in a way that its convex outside surface bears alternating poles if seen in peripheral direction and will produce a rotary field when rotated. The housing 19 containing the motor with the armature 2 has an opening 5 whose diameter is larger than that of the rotor 3, so that the latter can be inserted through this opening. At the edge of the opening a separation wall 6 of hemispherical shape is sealed to the housing 19. As only tensile stress will occur, this construction of the separation wall 6 will permit extremely high internal pressures inside the housing 19 at extremely thin wall widths, so that the magnetic coupling device allows the use of a motor of a refrigerating compressor which is located in said housing to act simultaneously as a drive for the outside fan rotor 1.

A tube 7 is fixed to the separation wall 6; this tube is closed at its end and bears a bearing member 8. This bearing member holds a ball 9 which is located at the end of a shaft journal 10. The other end of the shaft journal 10 bears a rotor 11 of hemispherical shape which is made from a permanent magnetic material. The concave surface 15 limiting the air gap 17 between the driving rotor 3 and the driven rotor 11 is concentrical to the spherical surface 16 forming the convex limitation of the air gap 17. The center of the ball 9 coincides with the centers of these two spherical surfaces 15 and 16, so that the rotor 11 is permitted to exert a universal movement about the center of the sphere 9.

Provision is made for a sealing ring 12 sealing the ball 9 towards the space containing the bearing member. At the other side this sealing ring is connected to bellows 13. The space 14 between the bellows and the tube 7 may be filled with a lubricant to lubricate the bearing. The bellows serves as a recipient for the lubricant and to press the seal towards the sphere.

As it will be seen from the drawing, the force driving the fan 1 mounted to the rotor 11 is transmitted between the two magnetic rotors 3 and 11 by magnetic forces, and at the same time the rotor 11 is permitted to exert a universal movement about the center of the ball 9. This has the advantage that the fan rotor does not require any radial bearing means which might be subject to wear and tear.

Figure 2:
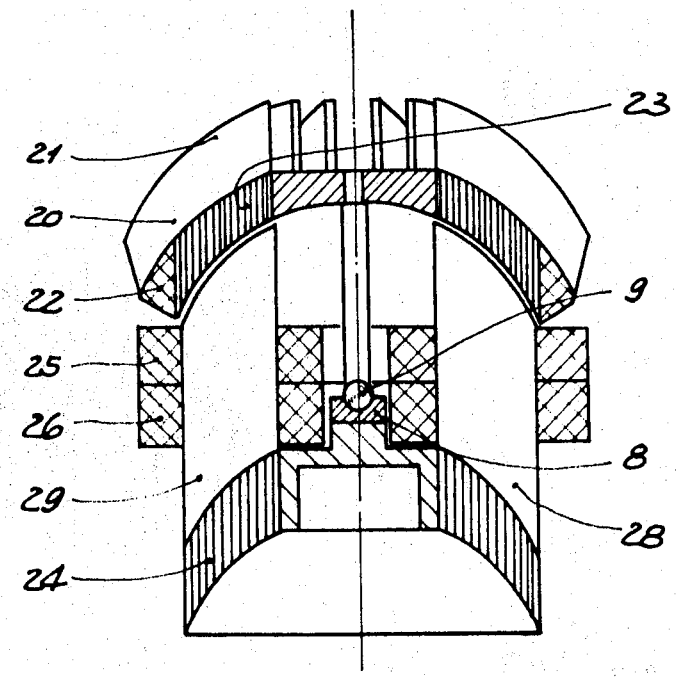
FIG. 2 shows a longitudinal section of another embodiment according to the invention in which the driven element is combined with a fan rotor.

FIG. 2 shows an embodiment according to the invention in which the rotor 23 is permitted to exert a universal movement about the center of the bearing ball 9. This rotor bears a fan rotor 20 having blades 21 and is connected to the squirrel cage coil 22 made of aluminum. The rotor 23 itself is made as a spiral-shaped metal sheet coil. It is connected to the bearing ball 9 in the same manner as described in FIG. 1.

Figure 2A:
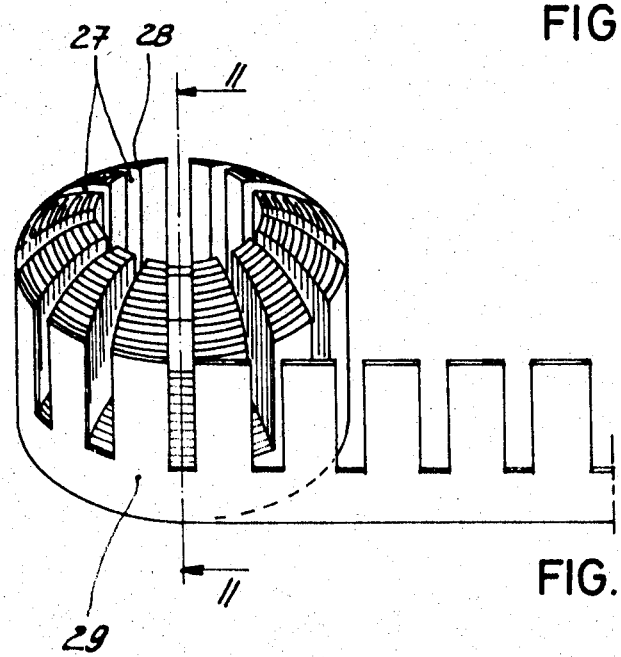
FIG. 2a is a perspective view of the iron core of the stator in an arrangement as per FIG. 2.

The element producing the rotary field is the stator 24 of the machine which is made from metal strips of a spiral-shaped coil (see FIG. 2a). Coils 25 and 26 are inserted in the coil channels 27 between the poles 28 and 29. The embodiment as per FIG. 2 differs from the embodiment as per FIG. 1 only in that the element 24 producing the rotary field is forming the stator and the driven element 23 acts as an armature of an electrical motor, whereas in the embodiment in FIG. 1 the elements 3 and 11 serve as coupling elements transmitting the driving force of the motor to the fan rotor.

FIG. 2a is a schematic view of the iron core of the stator 24, the section in FIG. 2 being made along the line II–II in FIG. 2a. The coil of the stator is inserted in the coil channels 27.

Figure 3:
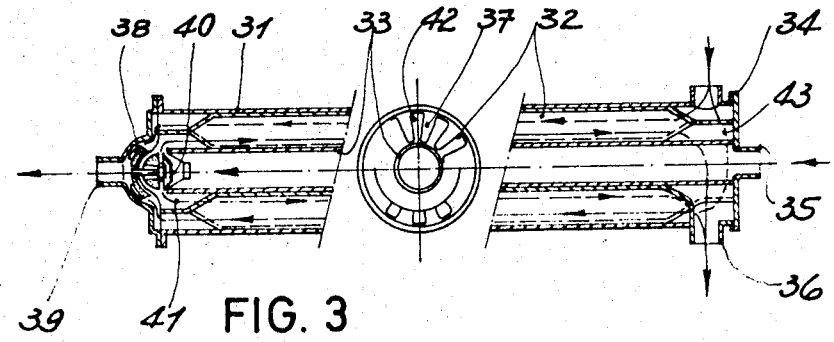
FIG. 3 shows a heat exchanger combined with a turbine and a pump coupled by means of a magnetic coupling device according to the invention, in cross section.

FIG. 3 shows a section of a heat exchanger having an outside tube 31, a heat exchanger tube 32 and an inside tube 33. The inlet 34 is connected to a tap water system. The liquid to be cooled enters in the inlet 35 and leaves the system in cooled condition through the outlet 36. The tap water runs through the channels 37 running parallel to the axis, flows through the turbine 38 and leaves the heat exchanger through the outlet 39. The pump 40 is driven by the turbine 38, so that the liquid in the tube 33 is transported to the annular space 41 and flows from there through the channels 42 to the annular space 43 communicating to the outlet channel 36. A simple valve adjustment of a valve which is not shown between the tap water system and the inlet 34 will regulate not only the cooling water volume but also the volume of the heat carrier fluid to be cooled strictly proportionally. Thus the consumption of cooling water is limited to the volume required for the cooling performance in each case or operating condition.

Figure 4:
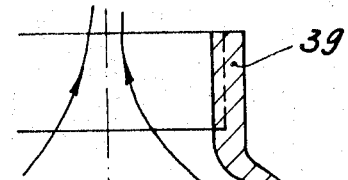
FIG. 4 is an enlarged partial section of the pump and turbine in the arrangement as per FIG. 3.

FIG. 4 shows the turbine-pump combination in a longitudinal section. The flange 50 incorporated in the outlet 39 is connected to the outside housing tube 31. The separating hemispheric wall 51 as well as the lid of the pump housing 52 and the end portion 53 of the star-shaped tube 32 are pinched into a flange gap. The separating hemispheric wall 51 has a bearing support 54 shaped like a hollow cone whose bottom holds a ball 55. This sphere is preferably made from a hard material, such as tungsten carbide or $Al_2O_3$. A turbine rotor consisting of a permanent magnet 58 and a blade cascade 59 is mounted above a support cone 56 and a seat 57 which is also made from a hard material. The liquid transported through the annular space 60 to the guide wheel 61 contains a swirl moment whose angular velocity is essentially enhanced by the deflection in a centripetal direction in the annular space 63. On the side of the ball away from the turbine there is also a bearing member 64 serving to support the pump rotor. This pump rotor consists of a magnet 65 having a convex surface towards the air gap, the blades 66, the covering ring 67 and an axially magnetized magnet 68. The pump housing 52 has perforations 69 which act as guide vanes to recuperate the swirl energy in the outlet flow in its form as pressure.

The concave surface of the magnet 58, the limiting surfaces of the separating hemisphere 51, the convex surface of the magnet 65, the convex annular area 70 of the cover ring 67 and the concave annular surface 71 of the pump housing 52 have the common center 72 together with the ball 55 and the concave bearing surfaces of the bearing members 57 and 64. In this way both rotors are mounted to permit a universal movement about a fixed point. The magnet 68 together with the annular magnet 73 will serve as a restriction of the pivoting angle, the annular magnet 73 being connected to the pump housing 52 via a (squirrel) cage 74 and effecting the centering of the magnet 68 by means of the same polarity. The weight of the magnet 68 also acts as a counterbalance tending to hold the magnet 65 in an equilibrium position, and as such, the magnet may be replaced by a separate counterweight.

Figure 5:
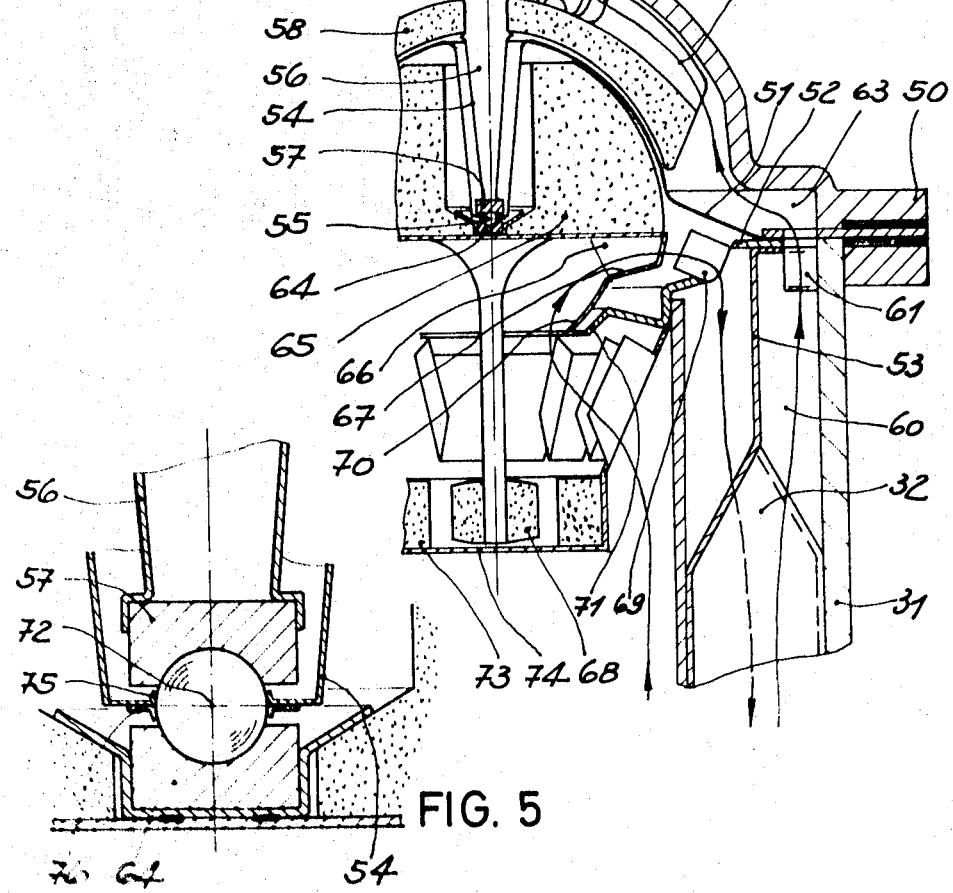
FIG. 5 shows a section of the bearing support means of the coupling shown in FIG. 4, on an enlarged scale.

FIG. 5 is a longitudinal section of the bearing in a much enlarged version. All parts bear the same reference as in FIG. 4. The closely fitted housing of the sphere is effected by the annular-shaped jet area 75 and a ring 76 of similar shape which is rigidly fixed, for instance by means of spot welding.

I claim:

1. A magnetic rotary machine including a first rotary magnetic element for generating an electrical field about the axis of rotation of said rotary machine and a second rotary magnetic element displaced axially with respect to said first element along the axis of rotation of said machine to form an air gap therebetween with the axially symmetrical surfaces of both elements facing the air gap having a common center about which both said elements have a limited universal movement and wherein the surface of one element facing the air gap is of concave shape and the surface of the other element facing the air gap is of convex shape and a ball bearing is positioned between said elements at said common center.

2. A magnetic rotary machine according to claim 1 characterized in that a separation wall is included in the air gap to separate said elements wherein the separation wall bears in its center a projecting part, the end of which engages said ball bearing with said ball bearing operatively forming a bearing surface for each of said elements.

3. A magnetic rotary machine according to claim 1 characterized in that at least one of the elements is adapted to be centered about its axis by exterior means.

4. A magnetic rotary machine according to claim 3 where said exterior means includes a magnet connected to one of said elements and displaced axially with respect to said common center and extending into a magnetized ring of the same polarity as the magnet and wherein a large air gap separates said magnet and said ring.

5. A magnetic rotary machine according to claim 4 characterized in that the axially magnetized magnet is connected to one of said elements by means of an axially extending bar.

6. A magnetic rotary machine according to claim 3 wherein one of said rotors is balanced by a counterbalance.